Sept. 8, 1970     R. H. STUDEBAKER     3,527,539

METHOD AND APPARATUS FOR INDICATING CENTER OF RADIANT ENERGY BEAM

Filed March 9, 1966     3 Sheets-Sheet 1

INVENTOR.
ROBERT H. STUDEBAKER
BY W. A. Schaich &
Thomas A. Meehan
ATTORNEYS

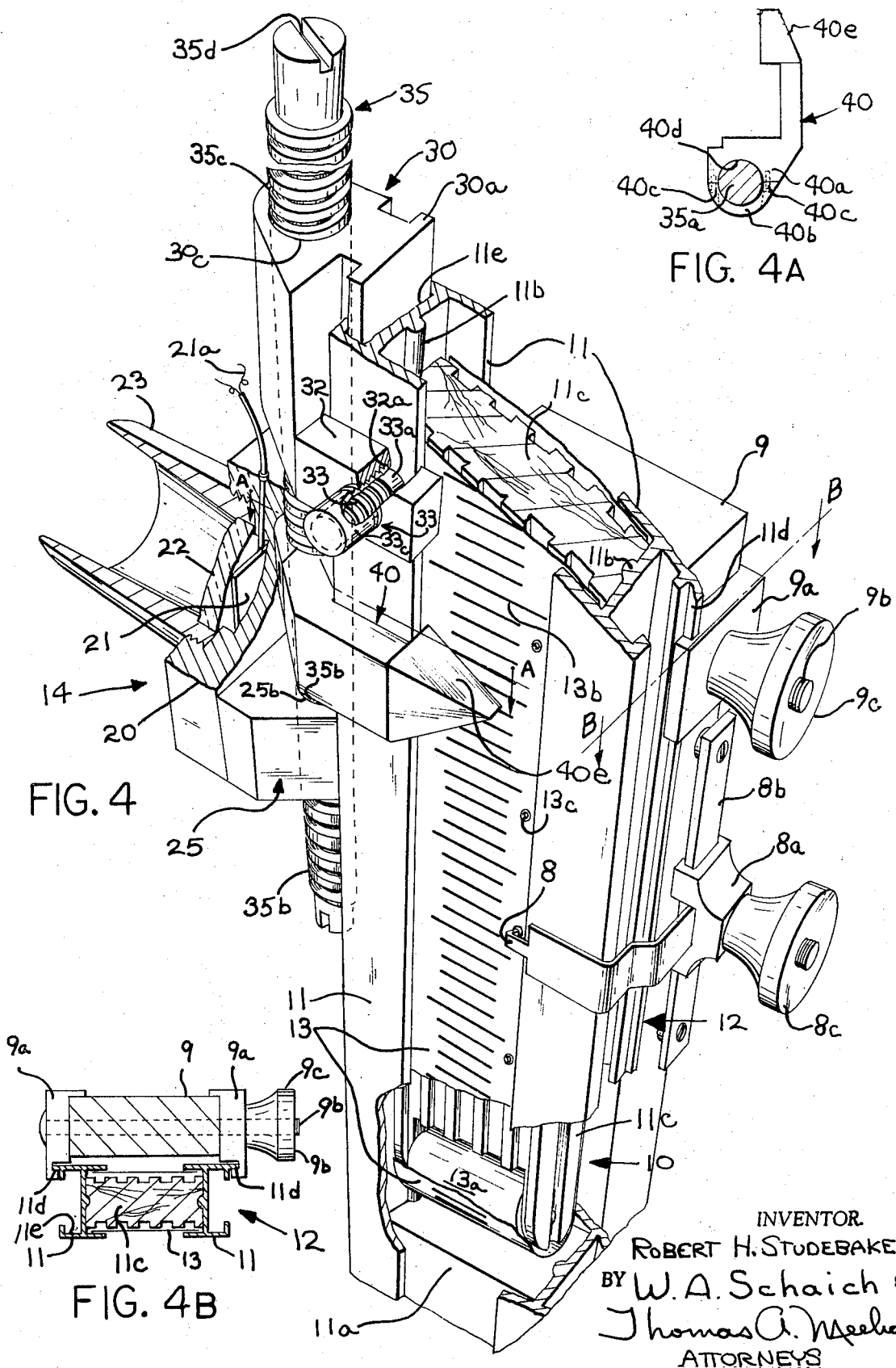

Sept. 8, 1970 R. H. STUDEBAKER 3,527,539
METHOD AND APPARATUS FOR INDICATING CENTER OF RADIANT ENERGY BEAM
Filed March 9, 1966 3 Sheets-Sheet 3
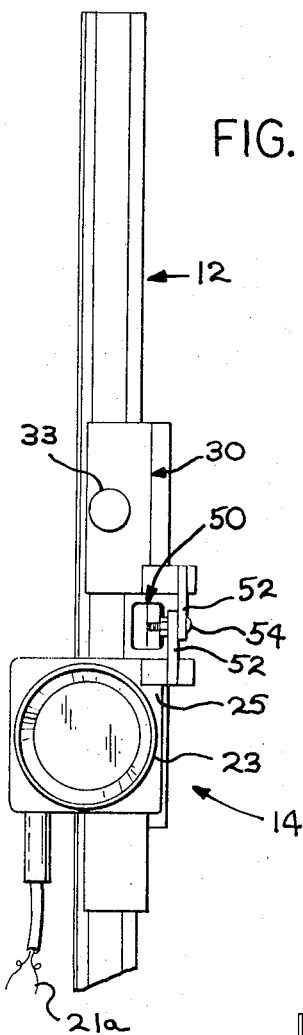
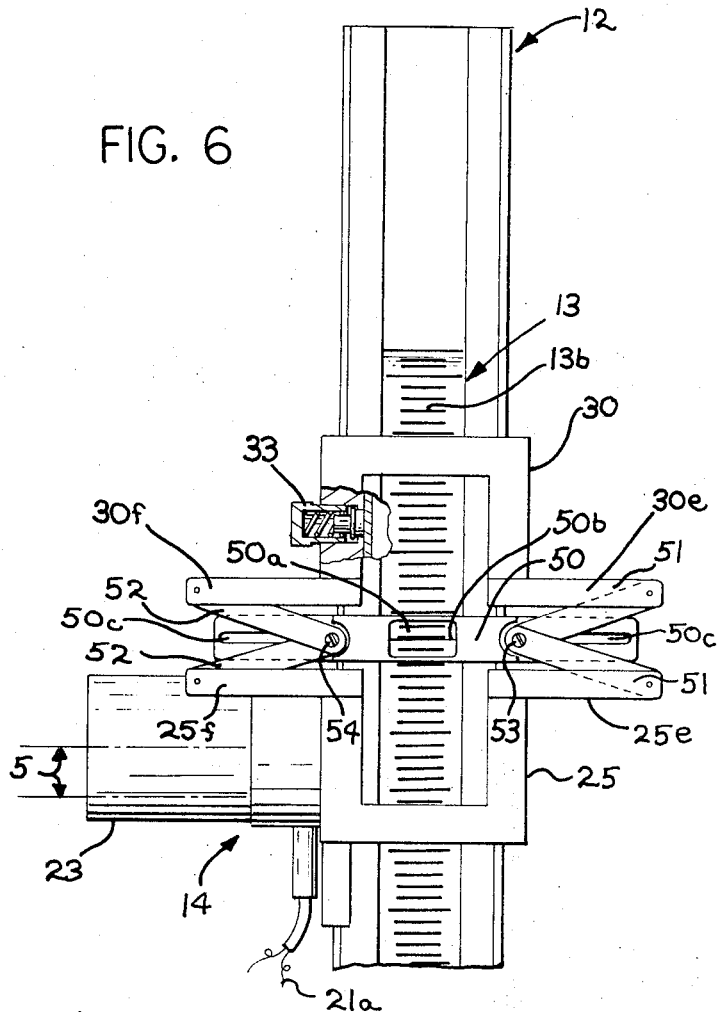
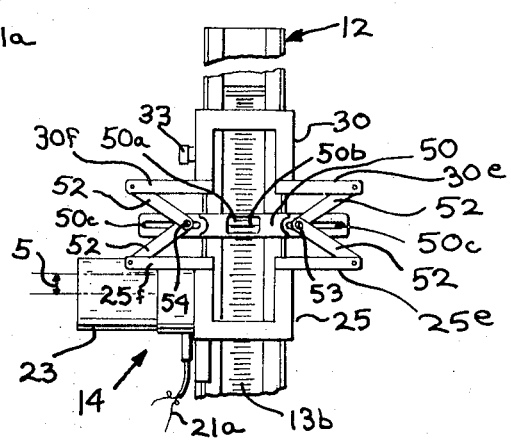
INVENTOR.
ROBERT H. STUDEBAKER
BY W. A. Schaich &
Thomas A. Meehan
ATTORNEYS United States Patent Office 3,527,539
Patented Sept. 8, 1970

3,527,539
METHOD AND APPARATUS FOR INDICATING CENTER OF RADIANT ENERGY BEAM
Robert H. Studebaker, Dayton, Ohio, assignor to Process Equipment Co. of Tipp City, Tipp City, Ohio, a corporation of Ohio
Filed Mar. 9, 1966, Ser. No. 532,944
Int. Cl. G01b 11/00
U.S. Cl. 356—156         4 Claims

ABSTRACT OF THE DISCLOSURE

A method of and apparatus for determining the precise center location of a beam of light at a finite distance from the point of origin of the beam. Preferably, the beam is emitted by a laser and the center location is determined by intercepting the two extremities of the beam by a movable beam-responsive device movable between the points of interception. The extent of movement of the beam-responsive device between the two interception points determines the beam dimension and a visual indication of the center of such movement indicates the beam-center location.

RELATED APPLICATIONS

This application is related to applicant's previous applications Ser. Nos. 468,821, filed July 1, 1965, now Pat. No. 3,364,715; 474,684, filed July 26, 1965 and now abandoned; 532,934, filed Mar. 9, 1966; 535,077, filed Mar. 17, 1966 and now abandoned; 540,755, filed Apr. 6, 1966. All of which applications are assigned to the assignee of this application.

BACKGROUND OF THE INVENTION

The subject matter of the aforementioned copending application shall be deemed to be incorporated herein by reference and will not be repeated in detail. Briefly, the surveying system disclosed therein utilizes a signal beam generated by the stimulated emission of a quantum device, commonly called a laser beam. A reference elevation plane may be determined with respect to any area being surveyed by creating a laser beam and then sweeping such beam over the area in a horizontal or conical plane, the absolute elevation of which is known. A surveying rod carrying elevation indicia and a beam receiver vertically adjustable along such rod, may then be positioned at any point within the effective radius of the laser beam and the vertical positioning of the receiver device on the elevation rod in alignment with the incident laser beam will provide an immediate indication of the elevation of the spot where the rod is located.

Any presently known laser beam utilized has a discreet width, although such beams have a minimum tendency to diverge when compared with light beams or radio signals. At a distance of say 1,000 feet from the laser beam generator it has been found that a collimated laser beam may have an overall width (which is actually vertically disposed) on the order of one inch. It is therefore necessary to provide an adjusting mechanism on the surveying rod utilized to detect such beam to actually locate the center of the incident laser beam, thereby eliminating any errors due to the varying width (vertical thickness) of the beam at different distances from the beam source.

Accordingly, it is an object of this invention to provide an improved surveying rod for use in detecting the elevation of an incident beam of electromagnetic energy.

A particular object of this invention is to provide a device usable on a surveyor's rod for accurately locating the center of an incident laser beam having a discreet thickness in a vertical direction, and a method for operating such devices.

Other objects and advantages of this invention will become apparent to those skilled in the art from the following detailed description, taken in conjunction with the annexed sheets of drawings on which there is shown several embodiments of this invention.

As shown on the drawings:

FIG. 4 is an enlarged perspective view partly in section, of the beam position detecting device embodying this invention applied to a known direct reading elevation rod;

FIG. 4A is a partial sectional view taken on the plane A—A of FIG. 4;

FIG. 4B is a partial sectional view taken on the plane B—B of FIG. 4;

FIG. 5 is a front elevational view of a modified device embodying this invention;

FIG. 6 is a side elevational view, partly in section, of FIG. 5, with the components in their initial positions; and FIG. 7 is a reduced scale view, similar to FIG. 6, but with the components of the beam indicating device in their final position.

On the drawings:

Figure 1:
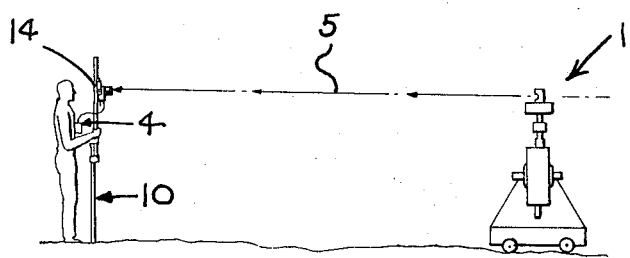
FIG. 1 is a schematic elevational view of a surveying system utilizing this invention.

Referring to FIG. 1, there is schematically illustrated a laser beam surveying system. A portable beam generator 1 is provided which may be of the type described and claimed in my copending patent application Ser. No. 474,684, filed July 26, 1965. Such generator produces a horizontal rotating laser beam 5 at a known elevation and is set up to sweep over the area to be surveyed.

Figure 2:
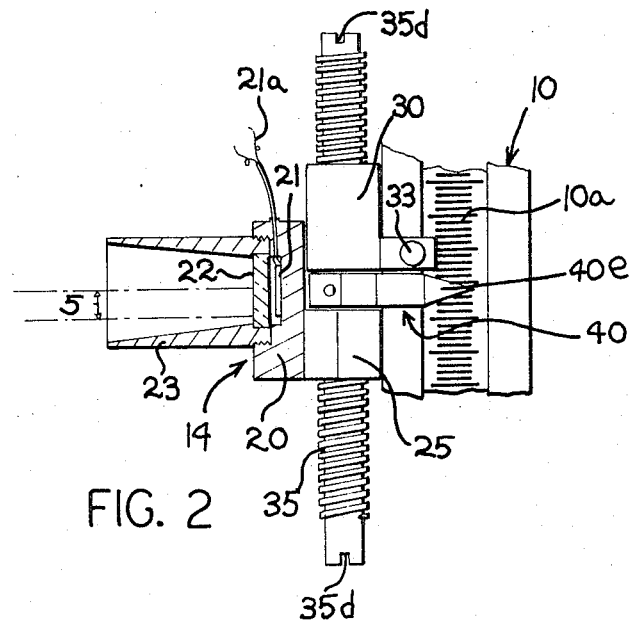
FIG. 2 is a side elevational view, partly in section, of a laser beam position detecting device embodying this inventon with the components thereof in their initial positions.
Figure 3:
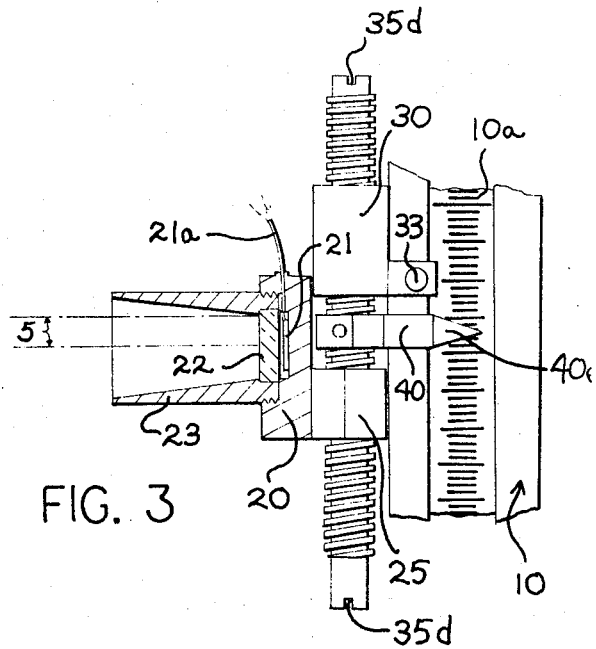
FIG. 3 is a view similar to FIG. 2, but with the components of the device in their final position for indicating the elevation of the center of the incident beam.

In FIGS. 1–3, reference numeral 10 illustrates a conventional indicia carrying surveyor's rod. Such rod may, if desired, carry fixed indicia 10a divided into feet and inches, or feet and decimal divisions. Alternatively, as is partly illustrated in FIGS. 4, 5, 6 and 7, the rod 10 may comprise a well-known direct reading type having a fixed bottom section 9 on which is slidably mounted an upper movable section 12, permitting conventional vertical sliding adjustment of the effective height of the rod.

Movable section 12 comprises two parallel, elongated plastic or metal extrusions 11 joined at their bottom portions by a block 11a and at their top portions by a second block (not shown). Each extrusion 11 is of generally I-shaped cross section and each has an interior rib 11b which serve to locate a plastic or wooden tape block 11c therebetween. The extrusions 11 forming the movable rod section 12 are each provided with a longitudinal flange 11d forming a track which is slidably received in an opposed pair of clamps 9a that are mounted on screw 9b which traverses the fixed rod section 9, and thus serves to slidably mount the movable rod section 12 on the fixed rod section 9. A knurled nut 9c on the end of clamping screw 9b permits the locking of the rod sections 12 and 9 at any desired relative longitudinal position.

The movable rod section 12 is otherwise constructed in conventional fashion to carry therewith an endless indicia carrying band or tape 13 which is trained over the tape block 11c and tape rollers 13a provided at such end of block 11c. Band 13 is provided on its face with elevation indicia 13b, and along one edge with a plurality of spaced eyelets 13c. Band 13 may be secured at any desired eyelet 13c to the fixed supporting rod by a locater device 8 that is transversely slidably mounted in a clamp 8a, which in turn is longitudinally slidable on a bar 8b mounted on fixed rod 9. A screw and nut 8c clamps locater device 8 and slidable clamp 8a in any desired position, and therefore additional portions of the band 13 will be exposed to view as the movable rod section 12 is vertically shifted with respect to the fixed supporting rod 9. The elevation indicating indicia 13b may then provide direct readings of the elevation without requiring any calculations. Direct reading band devices of this type are well known in the art, for example see U.S. Pat. No. 1,224,935 to Lenker, dated May 8, 1917, and for this reason the detailed construction and operation of the endless indicia carrying band 13 will not further be described.

A beam detecting assembly 14 is provided comprising a cell housing 20 in which are suitably mounted one or more laser beam responsive photocells 21, an ambient light blocking filter 22 (which passes only light at the laser beam frequency) and a cylindrical light hood or light shield 23. Suitable electrical connections 21a are provided to connect the beam responsive cells 21 to a suitable amplifying and indicator unit 4, which can be either carried by the rodman or mounted at a convenient point on the fixed post 10.

The beam detecting housing 20 is further provided with a slide block portion 25 (FIG. 4) having an integral dove-tailed portion (not shown) constructed to slidably mount the block portion in a cooperating dove-tailed slide groove 11e provided on one side of the movable rod section 12 or on the fixed rod 10, as the case may be. A second slide block 30 is provided having a dove-tailed portion 30a to slidably cooperate with the slide groove 11e of the movable rod 12, or the fixed rod 10, as the case may be. Thus the movable rod 12 is effectively provided with two longitudinal slide tracks, the one defined by the opposed flanges 11d on which the clamps 9a ride, and the other track being the dove-tailed slide groove 11e which mounts the slide blocks 25 and 30. With this construction, no interference of the various sliding components will be encountered.

Block portions 25 and 30 are respectively provided with axially aligned threaded apertures 25b and 30c. The threads in apertures 25b and 30c are identical in pitch but are respectively of an opposite direction, i.e., one is a right-hand thread and the other a left-hand thread. The slide blocks 25 and 30 are then interconnected by an adjusting screw 35 having a reduced cylindrical central portion 35a (FIG. 4A), a threaded end portion 35b cooperating with the threaded aperture 25b, and a reversely threaded portion 35c cooperating with the threaded aperture 30c of the second slide block 30. An indicator 40 is provided having a split base portion 40a and 40b defining, when assembled by screws 40c, a cylindrical aperture 40d permitting such indicator base to be freely rotatively mounted on the central portion 35a of the adjusting screw 35. Additionally, indicator 40 is provided with a projecting pointer 40e, the tip of which overlies the indicia 10a or 13b as the case may be, and is normally aligned with the optical center of the photoelectric cell unit 21, when the two block elements 25 and 30 are respectively screwed down on adjusting screw 35 to a position abutting the indicator base portion 40. Lastly, any suitable means for rotating screw 35 are provided, here shown as a screwdriver slot 35d in each end.

From the foregoing description, it will be apparent that the entire beam receiving assembly 14, composed of the beam housing 20, the first slide block 25, the second slide block 30 and the indicator 40 may be readily moved along the adjustable rod 12 (or the fixed rod 10, when used with such a rod) to any desired position.

Additionally, the second slide block 30 is provided with an extension 32 lying adjacent a continuously solid side of the movable rod 12 (or fixed rod 10 in the modification of FIG. 1). An adjustable friction type clamping device 33 is mounted in block extension 32 comprising a cylindrical friction shoe 33a, a spring 33b and a cup-shaped spring housing 33c which is threadably mounted in a suitable aperture 32a provided in the block extension 32. The amount of friction produced by the friction block 33a may be conveniently adjusted by threadable positioning of the spring housing 33c. The amount of friction should be selected so as to permit the beam receiver assembly 14 to be readily moved by hand along the supporting rod but yet retaining the second slide block 30 in any selected position against gravitational forces and forces produced by the turning of screw 35 and the accidental jarring of the surveying rod assembly during the taking of a reading.

In operating the above described mechanism, the surveyor's rod 10 is vertically positioned at the point where the elevation determination is desired, and the beam generator 1 is set up to scan the area with a rotating laser beam 5 which is at a known elevation. The slide blocks 25 and 30 are positioned in abutment with indicator 40. The rodman then manually moves the entire beam receiving assembly 14 along the supporting rod until the beam is detected, as indicated by the beam indicating unit 4. The beam detecting unit is then moved upwardly through the height of the beam until the top vertical edge of the beam is located as indicated by the point at which the beam indicating unit 4 ceases to operate (see FIG. 2). The adjusting screw 35 is then turned in any conventional fashion, for example, by a screwdriver inserted in the slot 35d in an end of the screw 35, and the screw 35 is turned in a direction to move the first slide block 25 and the associated beam receiving housing 20 vertically downwardly through the entire width (height) of the beam to the bottom vertical edge of the beam (see FIG. 3). Due to the fact that the second slide block 30 is maintained in a stationary position during such movement by the friction clamp 33, and the fact that the threaded sections 35b and 35c of adjusting screw 35 are exactly opposite in pitch, the indicator 40 will move exactly one-half the vertical distance traversed by the first slide block 25 and, as a result, the indicator pointer 40e will show on either the fixed indicia 10a of the simple rod 10 (FIGS. 1, 2 and 3), or on the endless band indicia 13b of the adjustable rod (FIG. 4), the elevation of the exact center of the incident laser beam 5.

Referring to FIGS. 5, 6 and 7, there is shown an alternative embodiment of this invention involving a different type of mechanism for corollating the movement of the beam indicator with the movement of the two slide blocks 25 and 30. In the device shown in FIGS. 5, 6 and 7, the indicator comprises a bar 50 slidably mounted on the rod 12 or 10, as the case may be, and having a central opening 50a traversed by a wire 50b which overlies the elevation indicia 10a or 13b. Alternatively, the bar 50 could be fabricated from a transparent plastic material in which case the aperture 50a could be dispensed with, and the function of the wire 50b could be assumed by a hairline painted on or engraved in the surface of the bar.

In either event, the bar 50 is provided at each of its outer extremities with elongated slots 50c. The first slide block 25 is provided with a pair of oppositely directed lateral extensions 25e and 25f extending generally parallel to the direction of the slots 50c. Similarly, the second slide block 30 is provided with lateral extensions 30e and 30f. Two pair of identical links 51 and 52 are provided, one link 51 being pivoted at one end to the extremity of block extension 25e and at the other end to a pin 53 which fits snugly in and traverses the slot 50c. The other link 51 is pivoted at one end to extension 30e and at its other end to pin 53. The one link 52 is pivoted at one end to the extremity of the block extension 30f and at its other end to the traverse pin 54 and the other link 52 is pivoted at one end to extension 25f and at its other end to pin 54. The operation of the embodiment shown in FIGS. 5, 6 and 7 is identical to that heretofore described in connection with the other embodiments. The entire beam indicator assembly 14 is moved as a unit upwardly or downwardly along the rod 10 or 12, as the case may be, until the top vertical edge of the laser beam 5 is located. The slide block 25 is then manually grasped and moved downwardly relative to the rod on which it is mounted while the second slide block 30 is maintained in the originally selected position by the friction clamp 33. By virtue of the linkage connections between the indicator bar 50, the first block 25 and the second block 30, the indicator bar 50 is moved downwardly a distance closely approximating one-half the distance moved by the first slide block 25 (see FIG. 7) and hence, when the first slide block 25 is located at the bottom extremity of the incident laser beam 5, the indicating wire 50b will show on the indicia carried by the rod 10 or 12, as the case may be, the location of the center of the incident beam 5. Those skilled in the art will recognize that this modification is not as accurate as the modification of FIG. 4 because of the accumulation of tolerances in the various links and pivot points.

Other modifications of this invention will be readily apparent to those skilled in the art and it is therefore desired to limit the invention only in accordance with the appended claims. For example, the term "elevation" is a relative term, meaning only a distance perpendicular to its plane of the laser beam, which may be either vertical or horizontal, depending on the measurements to be made.

What is claimed is:

1. The method of indicating the position of the center of a coherent beam of light in any of the visible and non-visible spectrums relative to a surveyor's rod on which said beam is incident, said method comprising the steps of concurrently moving a detector that generates a discernible signal when exposed to the light of said beam and an associated visual detector along the rod until the intensity of said signal is detected to have changed between a discernible signal and a non-discernible signal to locate one edge of the beam, then moving said detector through the width of said beam until the intensity of said signal is detected to have changed between a discernible signal and non-discernible signal to locate the other edge of said beam while concurrently moving the visible detector in the same direction but exactly one-half the distance traversed by said detector, whereby the final position of said indicator indicates the center of the beam.

2. The method as defined in claim 1 including the steps of moving said beam in a fixed circular path and positioning said rod perpendicular to the beam to extend through the beam, said rod carrying an indicia.

3. In a method of determining a precise center location of a beam of light at a finite distance from the point of origin of said beam, the steps of (1) interposing in the path of said beam and at said finite distance a detector that generates a discernible signal output when exposed to the light of said beam, said detector being movable relative to said beam through a distance at least as great as the width of said beam at said finite distance, (2) moving said detector until the signal output of said detector changes from a discernible signal to a non-discernible signal to establish one extremity of the beam, (3) moving said detector in a predetermined path through the complete width of said beam, (4) halting said detector when its signal output changes from a discernible signal to a non-discernible signal to establish the other extremity of said beam and (5) visually indicating the location of the midpoint of movement of said detector during the performance of steps (3) and (4).

4. A method as defined in claim 3, including the steps of emitting said beam of light from a laser, moving said laser such that the beam sweeps at a predetermined elevation across the location at which the beam center determination is to be made, at step (2) locating said detector at one vertical extremity of the beam at said location, in step (3) moving said detector along a vertical linear path and in step (4) halting said detector at the other vertical extremity of the beam at said location, whereby the visual location resulting from the performance of step (5) locates the vertical center plane of the movable laser beam.

References Cited

UNITED STATES PATENTS

| 432,328 | 7/1890 | Painter | 33—191 |
|---|---|---|---|
| 949,429 | 2/1910 | Harris | 33—60 |
| 1,064,470 | 6/1913 | Goodnow. | |
| 1,703,736 | 2/1929 | Jacob | 33—192 X |
| 2,603,002 | 7/1952 | Rubin et al. | 33—191 |
| 2,675,618 | 4/1954 | Jaworsky. | |
| 2,909,839 | 10/1959 | Miller. | |
| 3,071,049 | 1/1963 | Pizzarotti et al. | |

RONALD L. WIBERT, Primary Examiner

W. L. SIKES, Assistant Examiner